United States Patent [19]

Miller

[11] 3,723,623
[45] Mar. 27, 1973

[54] METHOD FOR CONTROLLING OBESITY
[75] Inventor: Oscar Neal Miller, Montclair, N.J.
[73] Assignee: Hoffmann-La Roche Inc., Nutley, N.J.
[22] Filed: June 5, 1972
[21] Appl. No.: 259,709

Related U.S. Application Data

[63] Continuation-in-part of Ser. No. 92,294, Nov. 23, 1970, abandoned.

[52] U.S. Cl....................................................424/266
[51] Int. Cl. ............................................A61k 27/00
[58] Field of Search......................................424/266

[56] References Cited

OTHER PUBLICATIONS

Miller et al., Lipid Pharmacology (R. Paoletti–Editor), Academic Press, N.Y. (1964), p. 264.

Primary Examiner—Stanley J. Friedman
Attorney—Samuel L. Welt et al.

[57] ABSTRACT

A method of utilizing 2,6-dihydroxynicotinic acid as an agent for inhibiting the synthesis of lipids and, consequently, reducing the weight of accumulated fat in warm-blooded animals, is described.

3 Claims, No Drawings

METHOD FOR CONTROLLING OBESITY

CROSS-REFERENCE TO RELATED APPLICATIONS

This application is a continuation-in-part of U.S. Pat. application, Ser. No. 92,294, filed Nov. 23, 1970, now abandoned.

BRIEF SUMMARY OF THE INVENTION

The invention relates to a method of reducing lipids in warm-blooded animals and, consequently, reducing the weight of said warm-blooded animals, which comprises administering a therapeutically effective amount of a compound selected from the group consisting of 2,6-dihydroxynicotinic acid and salts thereof formed with pharmaceutically acceptable bases.

DETAILED DESCRIPTION OF THE INVENTION

The invention relates to a method of utilizing 2,6-dihydroxy-nicotinic acid or its pharmaceutically acceptable salts as weight-reducing agents in warm-blooded animals.

The 2,6-dihydroxynicotinic acid utilized in the method of the invention can exist and be used either in its free acid form or as a salt formed with a pharmaceutically acceptable base. Such salts can be prepared by reaction with a base having a non-toxic, pharmaceutically acceptable cation. Thus, any base which will form a salt with a carboxylic acid and will not be toxic or have adverse pharmacological effects can be utilized. Exemplary of such bases are the alkali metal and alkaline earth metal hydroxides, carbonates and the like, for instance, sodium hydroxide, potassium hydroxide, calcium hydroxide and calcium carbonate, ammonia, primary, secondary and tertiary amines, such as mono-, di- or trialkylamines, for instance, methylamine, dimethylamine and trimethylamine, and nitrogen containing heterocyclic amines, for instance, piperidine and the like.

The compounds of the invention, i.e., 2,6-dihydroxynicotinic acid or its salts formed with pharmaceutically acceptable bases, lower the lipids level in warm-blooded animals and thus are useful in reducing the weight of accumulated fat in warm-blooded animals.

For such use, the presently disclosed compounds are formulated, using conventional inert pharmaceutical adjuvant materials, into dosage forms which are suitable for oral or parenteral administration. Such dosage forms include tablets, suspensions, solutions and the like. Furthermore, the 2,6-dihydroxynicotinic acid or its salts formed with pharmaceutically acceptable bases of this invention can be incorporated into, and administered in the form of, suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, poly-alkylene glycols and the like. Moreover, preservatives, stabilizers, wetting agents, emulsifying agents, salts for altering osmotic pressure, buffers, and the like, can be incorporated, if desired, into such formulations.

The quantity of active medicament which is present in any of the above-described dosage forms is variable. It is preferred, however, to provide capsules or tablets containing from about 100 mg. to about 1,000 mg. of 2,6-dihydroxynicotinic acid, or an equivalent amount of a pharmaceutically acceptable salt thereof formed with a base.

The frequency with which any such dosage form will be administered to a warm-blooded animal will vary, depending upon the quantity of active medicament present therein and the needs and requirements of the warm-blooded animal, as diagnosed by the prescriber. Under ordinary circumstances, however, from about 2.5 mg/kg. to about 25 mg/kg. of 2,6-dihydroxynicotinic acid can be administered daily in divided doses. A suitable regimen comprises 500 mg. three times a day. It is to be understood, however, that the dosages set forth herein are exemplary only and that they do not, to any extent, limit the scope or practice of this invention.

The 2,6-dihydroxynicotinic acid utilized in the method of the invention is a known compound and can be prepared according to procedures known in the art.

The following examples further illustrate the invention.

EXAMPLE 1

Tablet Formulation

|  | Per Tablet |
| --- | --- |
| 2,6-Dihydroxynicotinic acid | 100 mg. |
| Lactose, USP | 202 mg. |
| Corn Starch, USP | 80 mg. |
| Prehydrolyzed Corn Starch | 20 mg. |
| Calcium Stearate | 8 mg. |
| Total Weight | 410 mg. |

PROCEDURE 1. 2,6-Dihydroxynicotinic acid, lactose, corn starch and prehydrolyzed corn starch are blended in a suitable mixer.
2. The mixture is granulated to a heavy paste with water and the moist mass is passed through a No. 12 screen, and then dried overnight at 110°F.
3. The dried granules are passed through a No. 16 screen and transferred to a suitable mixer. The calcium stearate is added and mixed until uniform.
4. The mixture is compressed at a tablet weight of 410 mg. using tablet punches having a diameter of approximately three-eighths inch. (Tablets may be either flat or biconvex and may be scored if desired.)

EXAMPLE 2

Tablet Formulation

|  | Per Tablet |
| --- | --- |
| 2,6-Dihydroxynicotinic acid | 250.0 mg. |
| Lactose | 200.0 mg. |
| Corn Starch | 100.0 mg. |
| Pregelatinized Corn Starch | 25.0 mg. |
| Calcium Stearate | 10.0 mg. |
| Total Weight | 585.0 mg. |

PROCEDURE 1. 2,6-Dihydroxynicotinic acid, lactose, corn starch and pregelatinized corn starch are mixed in a suitable mixer.
2. The mix is passed through a Fitzpatrick Comminuting Machine fitted with No. 1A screen, with knives forward.
3. The mixture is returned to the mixer and moistened with water to a thick paste. The moist mass is passed through a No. 12 screen, and the moist granules are dried on paper-lined trays at 110°F.
4. The dried granules are returned to the mixer, and the calcium stearate is added and mixed well.
5. The granules are compressed at a tablet weight of 585 mg. using standard concave punches having a diameter of approximately 12.7 mm. (one-half inch).

EXAMPLE 3

Capsule Formulation

|  | Per Capsule |
|---|---|
| 2,6-Dihydroxynicotinic acid | 250.0 mg. |
| Lactose | 60.0 mg. |
| Corn Starch | 35.0 mg. |
| Talc | 5.0 mg. |
| Total Weight | 350.0 mg. |

PROCEDURE 1. 2,6-Dihydroxynicotinic acid, lactose and corn starch are mixed in a suitable mixer.
2. The mixture is passed through a Fitzpatrick Comminuting Machine using a No. 1A screen, with knives forward.
3. The mixture is returned to the mixer and the talc is added. This mixture is then blended well and filled into No. 2 two-piece, hard shell gelatin capsules on a capsulating machine.

I claim:

1. A method of reducing the weight of accumulated fat in an obese warm-blooded animal which comprises administering to said warm-blooded animal a therapeutically effective amount of a compound selected from the group consisting of 2,6-dihydroxynicotinic acid and a salt thereof formed with a pharmaceutically acceptable base.
2. A method in accordance with claim 1, wherein the therapeutically effective amount is in the range of about 2.5 mg/kg. to about 25 mg/kg. administered daily in divided doses.
3. A method in accordance with claim 2, wherein the compound administered is 2,6-dihydroxynicotinic acid.

* * * * *